(12) United States Patent
Peot et al.

(10) Patent No.: US 7,398,719 B2
(45) Date of Patent: Jul. 15, 2008

(54) MITER SAW HAVING A LIGHT BEAM ALIGNMENT SYSTEM

(75) Inventors: David G. Peot, Easley, SC (US); Philip F. Minalga, Anderson, SC (US); George M. Hornick, Anderson, SC (US); William C. Buck, Clemson, SC (US); William E. Kaiser, Anderson, SC (US)

(73) Assignee: Eastway Fair Company Limited, Tortola (VG)

( * ) Notice: Subject to any disclaimer, the term of this patent is extended or adjusted under 35 U.S.C. 154(b) by 0 days.

(21) Appl. No.: 11/156,358

(22) Filed: Jun. 17, 2005

(65) Prior Publication Data

US 2005/0217445 A1    Oct. 6, 2005

Related U.S. Application Data

(63) Continuation of application No. 10/774,854, filed on Feb. 9, 2004, now abandoned, which is a continuation of application No. 09/860,898, filed on May 18, 2001, now Pat. No. 6,755,107.

(51) Int. Cl.
*B26D 7/00* (2006.01)

(52) U.S. Cl. .................. 83/520; 83/521; 83/522.15; 83/581; 30/390

(58) Field of Classification Search ............ 83/521, 83/522.15, 581, 520, 432, 522.11, 471.3, 83/471.2, 477.1, 486.1, 490, 478; 30/390, 30/391, 382, 388, 370, 295; 362/259, 376, 362/800, 89

See application file for complete search history.

(56) References Cited

U.S. PATENT DOCUMENTS

| 1,476,238 | A | 12/1923 | Bump |
| 1,804,764 | A | 5/1931 | Grant |
| 1,993,219 | A | 3/1935 | Merrigan |
| 2,095,330 | A | 10/1937 | Hedgpeth |
| 2,267,189 | A | 12/1941 | Brown |
| 2,307,820 | A | 1/1943 | Butters |
| 2,313,686 | A | 3/1943 | Uremovich |

(Continued)

FOREIGN PATENT DOCUMENTS

DE    3104340 A1    2/1982

(Continued)

OTHER PUBLICATIONS

Dewalt's instruction manual DW705, Copyright 1993, 1995.*

(Continued)

*Primary Examiner*—Boyer D. Ashley
*Assistant Examiner*—Omar Flores Sánchez
(74) *Attorney, Agent, or Firm*—Brinks Hofer Gilson & Lione

(57) ABSTRACT

A table saw such as a chop saw, a miter saw, compound miter saw or a sliding compound miter saw that is provided with a laser arbor alignment system. An opaque shield or transparent shield having an opaque mask blocks the laser beam from being projected into a range of normal operator eye positions. One or more openings in the shield or opaque mask provide a sight line on a workpiece initially. As the saw is moved into engagement with the workpiece, the shield is pivoted away from the workpiece and a solid laser line is projected on the workpiece.

22 Claims, 5 Drawing Sheets

U.S. PATENT DOCUMENTS

| | | |
|---|---|---|
| 2,357,194 A | 8/1944 | Hazelton et al. |
| 2,440,950 A | 5/1948 | Hill |
| 2,488,947 A | 11/1949 | Vavrik |
| 2,623,555 A | 12/1952 | Eschenburg |
| 2,806,492 A | 9/1957 | Becker |
| 2,876,810 A * | 3/1959 | Peterson et al. ............... 83/471 |
| 3,123,111 A | 3/1964 | Mattson |
| 3,496,814 A | 2/1970 | Bessim |
| 3,780,777 A | 12/1973 | Davies |
| 4,078,869 A | 3/1978 | Honeycutt |
| 4,257,297 A | 3/1981 | Nidbella |
| 4,335,510 A | 6/1982 | Close et al. |
| 4,383,373 A | 5/1983 | Couturier |
| 4,413,662 A | 11/1983 | Gregoire et al. |
| 4,450,627 A | 5/1984 | Morimoto |
| 4,469,931 A | 9/1984 | Macken |
| 4,503,740 A | 3/1985 | Brand et al. |
| 4,598,481 A | 7/1986 | Donahue |
| 4,651,732 A | 3/1987 | Frederick |
| 4,676,130 A | 6/1987 | Nutt |
| 4,725,933 A | 2/1988 | Houk |
| 4,805,500 A | 2/1989 | Saito et al. |
| 4,805,504 A | 2/1989 | Fushiya et al. |
| 4,817,839 A | 4/1989 | Weissman |
| 4,833,782 A | 5/1989 | Smith |
| 4,836,671 A | 6/1989 | Bautista |
| 4,885,965 A | 12/1989 | Weissman |
| 4,885,967 A | 12/1989 | Bell et al. |
| 4,887,193 A | 12/1989 | Dieckmann |
| D305,542 S | 1/1990 | Miyamoto et al. |
| 4,892,022 A | 1/1990 | Cotton et al. |
| 4,934,233 A | 6/1990 | Brundage et al. |
| 4,945,797 A | 8/1990 | Hahn |
| 5,038,481 A | 8/1991 | Smith |
| 5,060,384 A | 10/1991 | Everts |
| 5,121,188 A | 6/1992 | Partridge et al. |
| 5,148,232 A | 9/1992 | Duey et al. |
| 5,199,343 A | 4/1993 | O'Banion |
| 5,203,245 A | 4/1993 | Terpstra |
| 5,285,708 A | 2/1994 | Bosten et al. |
| D346,173 S | 4/1994 | Price |
| 5,316,014 A | 5/1994 | Livingston |
| 5,320,111 A | 6/1994 | Livingston |
| 5,365,822 A | 11/1994 | Stapleton et al. |
| 5,375,495 A | 12/1994 | Bosten et al. |
| 5,439,328 A | 8/1995 | Haggerty et al. |
| 5,446,635 A | 8/1995 | Jehn |
| 5,461,790 A | 10/1995 | Olstowski |
| 5,495,784 A | 3/1996 | Chen |
| 5,509,337 A | 4/1996 | Norman et al. |
| 5,522,683 A | 6/1996 | Kakimoto et al. |
| 5,529,441 A | 6/1996 | Kosmowski et al. |
| D372,484 S | 8/1996 | Price et al. |
| 5,546,840 A | 8/1996 | Supe-Dienes |
| 5,630,277 A | 5/1997 | Kimura |
| D383,765 S | 9/1997 | Kani et al. |
| 5,662,017 A | 9/1997 | Mellon |
| 5,675,899 A | 10/1997 | Webb |
| D388,442 S | 12/1997 | Shibata et al. |
| D391,973 S | 3/1998 | Price et al. |
| 5,724,875 A | 3/1998 | Meredith et al. |
| 5,741,096 A | 4/1998 | Olds |
| 5,782,842 A | 7/1998 | Kloess et al. |
| D400,215 S | 10/1998 | Price et al. |
| 5,862,727 A | 1/1999 | Kelly |
| 5,911,482 A | 6/1999 | Campbell et al. |
| 5,918,523 A | 7/1999 | Cutter |
| 5,943,931 A | 8/1999 | Stumpf et al. |
| 5,949,810 A | 9/1999 | Star et al. |
| 5,957,021 A | 9/1999 | Meredith et al. |
| 5,967,645 A | 10/1999 | Anderson |
| 5,995,230 A | 11/1999 | Madlener et al. |
| 5,996,460 A | 12/1999 | Waite |
| 5,996,482 A | 12/1999 | Kirk et al. |
| D420,370 S | 2/2000 | Shibata et al. |
| D421,267 S | 2/2000 | Price et al. |
| 6,035,757 A | 3/2000 | Caluori et al. |
| D423,526 S | 4/2000 | Brazell et al. |
| D424,076 S | 5/2000 | Dibbern et al. |
| D425,083 S | 5/2000 | Brickner, Jr. et al. |
| 6,055,734 A | 5/2000 | McCurry et al. |
| 6,073,621 A | 6/2000 | Cetrangolo |
| D428,426 S | 7/2000 | Brazell |
| 6,170,370 B1 | 1/2001 | Sommerville |
| 6,182,548 B1 | 2/2001 | Meredith et al. |
| 6,203,112 B1 | 3/2001 | Cook et al. |
| D441,771 S | 5/2001 | Bean et al. |
| 6,237,230 B1 | 5/2001 | Campbell et al. |
| 6,263,584 B1 | 7/2001 | Owens |
| 6,397,717 B1 | 6/2002 | Waite |
| 6,403,920 B1 | 6/2002 | Muneyuki et al. |
| 6,481,322 B1 | 11/2002 | Hsiung |
| 6,523,447 B2 | 2/2003 | Judge |
| 6,578,459 B2 | 6/2003 | Waite |
| 6,593,587 B2 | 7/2003 | Pease |
| 6,688,203 B2 | 2/2004 | Chen |
| 6,742,430 B2 | 6/2004 | Chen |
| 6,755,107 B2 | 6/2004 | Peot et al. |
| 6,757,984 B2 | 7/2004 | Harris |
| 2001/0029819 A1 | 10/2001 | Okouchi |
| 2001/0034951 A1 | 11/2001 | Sears |
| 2001/0049988 A1 | 12/2001 | Ushiwata et al. |
| 2002/0000148 A1 | 1/2002 | Brun |
| 2002/0170404 A1 | 11/2002 | Peot et al. |
| 2003/0197138 A1 | 10/2003 | Pease et al. |

FOREIGN PATENT DOCUMENTS

| | | |
|---|---|---|
| DE | 3500371 A1 | 7/1986 |
| DE | 10119061 A1 | 11/2001 |
| EP | 0 504 745 A1 | 9/1992 |
| GB | 599718 | 3/1948 |
| GB | 674894 | 7/1952 |
| GB | 782280 | 9/1957 |
| GB | 1016387 | 1/1966 |
| GB | 2065995 | 9/1997 |
| GB | 2071064 | 7/1998 |
| JP | 8197381 | 8/1996 |
| JP | 11-170203 | 6/1999 |
| JP | 2000-225602 | 8/2000 |
| JP | 2000-225603 | 8/2000 |
| JP | 2000-317901 | 11/2000 |
| JP | 2001-150401 | 6/2001 |
| JP | 2001-158003 | 6/2001 |
| JP | 2001-300818 | 10/2001 |
| JP | 2001-300902 | 10/2001 |
| JP | 2001-347501 | 12/2001 |

OTHER PUBLICATIONS

Dewalt's instruction manual DW708, Copyright 1997.*
Catalog #461 Tool Crib, Feb. 2004, p. 14.*
"12" Compound Laser Miter Saw (Model 36-255L), Twinlaser™-Instruction Manual", Delta Machinery, 2002, pp. 1-21.
Anthony Pellegrini Deposition, dated Aug. 5, 2005.
Applications/Wood, Z-LASER.com, http://www.z-laser.de/e/anwendung/anwend_grp.htm?prg=Wood.
Black & Decker BTI 500, photographs, date unknown.
Black and Decker Quantum Pro Q910, photographs, date unknown.
BladePoint Laser Guide, BLADEPOINT™ Laser Guide Accurate Cutting Just Got Easier, http://www.bladepoint.com.
BladePoint Laser Guide Technology for Saws, Instruction Manual, date unknown.
Building Trades and Home Shop Machinery, Delta, 1993, see generally pp. 5-25.

Byron Trantharn Deposition, dated Jul. 29, 2005.
Catalogue, "DeWalt High Performance Professional Tools & Accessories", 1997/1998, pp. 82-83 and 86-87.
Defendants Pentair, Inc., Porter-Cable Corp. and Delta International Machinery Corp.'s Answers to One World Technologies, Ltd.'s First Set of Interrogatories (Nos. 1-15), dated Oct. 25, 2004.
Defendants Pentair, Inc., Porter-Cable Corp. and Delta International Machinery Corp.'s First Amended and Supplemental Answers to One World Technologies, Ltd.'s First Set of Interrogatories (Nos. 1-15), dated Jan. 28, 2005.
Defendants Pentair, Inc., Porter-Cable Corp. and Delta International Machinery Corp.'s Second Amended and Supplemental Answers to One World Technologies, Ltd.'s First Set of Interrogatories (Nos. 1-15), dated Mar. 3, 2005.
Defendants Pentair Inc., Porter-Cable Corp. and Delta International Machinery Corp.'s Sixth Amended and Supplemental Answers to One World Technologies, Ltd.'s First Set of Interrogatories (Nos. 1-15), dated Sep. 2, 2005.
Defendants Pentair, Inc., Porter-Cable Corp. and Delta International Machinery Corp.'s Third Amended and Supplemental Answers to One World Technologies, Ltd.'s First Set of Interrogatories (Nos. 1-15), dated Mar. 22, 2005.
Defendant Power Tool Specialists, Inc.'s Responses to Plaintiffs' First Amended Set of Requests for Admission, dated Jul. 11, 2005.
Defendant Rexon Industrial Corporation, Ltd.'s Responses to Plaintiffs' First Amended Set of Requests for Admission, dated Jul. 11, 2005.
Defendant Rexon USA's Responses to Plaintiff's First Set of Interrogatories, dated Aug. 29, 2005.
Defendant Rexon's Supplemental Response to Plaintiff's First Set of Interrogatories, dated Feb. 3, 2005.
Delta 12" Compound Miter Saw, Model 36-255, photograph, date unknown.
Delta Miter Saws, photograph, date unknown.
DeWALT model DW706, photographs, date unknown.
Double Insulated Miter Saw with LaserLoc, Line-of-Cut Indicator, Instruction Manual, Porter Cable.
Garcia et al., U.S. Appl. No. 10/632,561, filed Jul. 31, 2003.
http://web.archive.org/web/19981205131339/http:/www.bladepoint.com/index/html, printed Mar. 22, 2005.
http://web.archive.org/web/19981205152201/www.bladepoint.com/FAQs.htm, printed Aug. 4, 2005.
http://web.archive.org/web/19990128012942/www.bladepoint.com/CMS.htm, printed Mar. 23, 2005.
http://web.archive.org/web/19990415135109/www.bladepoint.com/pr01.htm, printed Aug. 4, 2005.
http://web.archive.org/web/19991013191602/www.bladepoint.com/FAQs.htm, printed Mar. 23, 2005.
http://web.archive.org/web/19991018203358/www.bladepoint.com/ryobi.htm, printed Mar. 22, 2005.
http://web.archive.org/web/20000301034502/www.bladepoint.com/CMS.htm, printed Oct. 17, 2005.
http://web.archive.org/web/20000511085453/http://www.bladepoint.com/, printed Aug. 4, 2005.
http://web.archive.org/web/20000621193659/www.bladepoint.com/faq.html, printed Mar. 23, 2005.
http://web.archive.org/web/20000621203346/www.bladepoint.com/info.html, printed Aug. 4, 2005.
http://web.archive.org/web/20000621224655/www.bladepoint.com/news.html, printed Mar. 23, 2005.
http://web.archive.org/web/19981205152201/www.bladepoint.com/FAQs.htm, printing date unknown.
http://web.archive.org/web/20000303144916/http://www.bladeopint.com/, printing date unknown.
http://web.archive.org/web/20000301034502/www.bladepoint.com/CMS.htm, printing date unknown.
http://web.archive.org/web/19990128012942/www.bladepoint.com/CMS.htm, printing date unknown.
http://web.archive.org/web/19981205131339/http://www.bladepoint.com/index.html, printing date unknown.
http://web.archive.org/web/20000621203346/www.bladepoint.com/info.html.
http://web.archive.org/web/2000087084635/www.gochargeit.com/enetgroup/bladepoint/safeorder.htm, printing date unknown.
http://web.archive.org/web/20000511085453/http://www.bladepoint.com/, printing date unknown.
Bladepoint Laser Alignment System Operator's Manual, printing date unknown.
Bladepoint materials (8 pages), publication date unknown.
"Important Information" (3 pages), publication date unknown.
Request for *Ex Parte* Reexamination of US 6,755,107 dated Aug. 28, 2006, including Exhibits A-Q; granted tracking No. 90/008,197.
Response to Notice of Failure to Comply with *Ex Parte* Reexamination Request Filing Requirements (37 C.F.R. 1.510(c)), dated Oct. 5, 2006.
Replacement Request for Reexamination of U.S. Patent No. 6,755,107; including Claim Charts—BladePoint Materials (§102(b)) and BladePoint Materials in View of DeWalt Publications (§103(a)), and Replacment 37 CFR 1.501—Information Disclosure Citation in a Patent.
Papers from European Opposition Proceeding EP 01 309 338.0 based on EP 1 258 305, various dates.
Black and Decker Quantam Pro Q910, photographs, date unknown.
BladePoint Laser Guide Technology for Saws, Instruction Manual, date unknown.
Byron Trantham Deposition, dated Jul. 29, 2005.
Defendants Pentair, Inc., Porter-Cable Corp. and Delta International Machinery Corp.'s First Amended and Supplemental Answers to One World Technologies, Ltd.'s First Set of Interrogatories (Nos. 1-15), dated Jan. 28, 2005.
Defendants Pentair, Inc., Porter-Cable Corp. and Delta International Machinery Corp.'s Second Amended and Supplemental Answers to One World Technologies, Ltd.'s First Set of Interrogatories (Nos. 1-15), dated Mar. 3, 2005.
Defendants Pentair Inc., Porter-Cable Corp. and Delta International Machinery Corp.'s Sixth Amended and Supplemental Answers to One World Technologies, Ltd.'s First Set of Interrogatories (Nos. 1-15), dated Sep. 2, 2005.
Defendants Pentair, Inc., Porter-Cable Corp. and Delta International Machinery Corp.'s Third Amended and Supplemental Answers to One World Technologies, Ltd.'s First Set of Interrogatories (Nos. 1-15), dated Mar. 22, 2005.
Defendant Power Tool Specialists, Inc.'s Responses to Plaintiffs' First Amended Set of Requests for Admission, dated Jul. 11, 2005.
Defendant Rexon Industrial Corporation, Ltd.'s Responses to Plaintiffs' First Amended Set of Requests for Admission, dated Jul. 11, 2005.
Defendant Rexon USA's Responses to Plaintiff's First Set of Interrogatories, dated Aug. 29, 2005.
Defendant Rexon's Supplemental Response to Plaintiff's First Set of Interrogatories, dated Feb. 3, 2005.
Delta 12" Compound Miter Saw, Model 36-255, photograph, date unknown.
Delta Miter Saws, photograph, date unknown.
DeWalt model DW706, photographs, date unknown.
Garcia et al., U.S. Appl. No. 10/632,561, filed Jul. 31, 2003.
http://web.archive.org/web/19981205131339/http:/www.bladepoint.com/index/html, printed Mar. 22, 2005.
http://web.archive.org/web/19981205152201/www.bladepoint.com/FAQs.htm, printed Aug. 4, 2005.
http://web.archive.org/web/19990128012942/www.bladepoint.com/CMS.htm, printed Mar. 23, 2005.
http://web.archive.org/web/19990415135109/www.bladepoint.com/pr01.htm, printed Aug. 4, 2005.
http://web.archive.org/web/19991013191602/www.bladepoint.com/FAQs.htm, printed Mar. 23, 2005.
http://web.archive.org/web/19991018203358/www.bladepoint.com/ryobi.htm, printed Mar. 22, 2005.
http://web.archive.org/web/20000301034502/www.bladepoint.com/CMS.htm, printed Oct. 17, 2005.
http://web.archive.org/web/20000511085453/http://www.bladepoint.com/, printed Aug. 4, 2005.
http://web.archive.org/web/20000621193659/www.bladepoint.com/faq.html, printed Mar. 23, 2005.

http://web.archive.org/web/20000621203346/www.bladepoint.com/info.html, printed Aug. 4, 2005.
http://web.archive.org/web/20000621224655/www.bladepoint.com/news.html, printed Mar. 23, 2005.
http://web.archive.org/web/20000817084635/www.gochargeit.com/enetgroup/bladepoint/safeorder.htm, printed Aug. 4, 2005.
James Baird Deposition, dated Jan. 18, 2005.
News Release, "After Two years of Development, An Affordable Laser Guide for Circular Saw is Now Available", Feb. 9, 2000.
Power Tool Specialist's, Inc.'s Responses to Plaintiffs' Interrogatories (Nos. 1-15), dated Oct. 25, 2004.
Product Picks from the National Hardware Show, Fall Homes, 1992.
Rexon Industrial Corp. Ltd.'s Responses to Plaintiffs' Interrogatories (Nos. 1-15), dated Oct. 25, 2004.
Sampson, W., "Laser Accuracy for Your Circular Saw", *CabinetMaker*, pp. 96, May 2000.
Sears Craftsman model 315.243150, photographs, date unknown.
Tom Greenway Deposition, dated Sep. 8, 2005.
William Jones Sampson Deposition, dated Mar. 23, 2005.
DVD Serial No. PWD657IH0119329944, video of use of miter saw with prototype of the Bladepoint device, referred to in pp. 40-46 and 108 of James Baird Deposition of Jan. 18, 2005 (A167).
Jerry L. Manning, Sr. Deposition, dated Sep. 28, 2005.
Jerry L. Manning, II Deposition, dated Sep. 28, 2005.
Charles Smith Deposition, dated Sep. 12, 2005.
Raymond Caluori Deposition, dated Sep. 30, 2005.
Dale Dedrick Deposition, dated Sep. 23, 2005.
Two pages of color photographs, date unknown.
http://web.archive.org/web/1990417135109/www.bladepoint.com/pr01.htm, printing date unknown.
http://web.archive.org/web/199812005131339/http://wwwbladepoint.com/index.html, printing date unknown.
http://web.archive.org/19991018203358/www.bladepoint.com/ryobi.htm, printing date unknown.
http://web.archive.org/web/20000817084654/www.bladepoint.com/faq.html, printing date unknown.
http://web.archive.org/web/20000621224655/www.bladepoint.com/news.html.
http:www.archive.org/web/20000621193659/www.bladepoint.com/faq.html, printing date unknown.
http://web.archive.org/web/19981205152201/www.bladepoint.com/FAQs.htm, printing date unknown.
http://web.archive.org/web/20000303144916/http://www.bladeopint.com/, printing date unknown.
http://web.archive.org/web/20000301034502/www.bladepoint.com/CMS.htm, printing date unknown.
http://web.archive.org/web/19990128012942/www.bladepoint.com/CMS.htm, printing date unknown.
http://web.archive.org/web/19981205131339/http://www.bladepoint.com/index.html, printing date unknown.
http://web.archive.org/web/2000087084635/www.gochargeit.com/enetgroup/bladepoint/safeorder.htm, printing date unknown.
http://web.archive.org/web/20000511085453/http://www.bladepoint.com/, printing date unknown.
Bladepoint Laser Alignment System Operator's Manual, print date unknown.
Bladepoint materials (8 pages), publication date unknown.
"Important Information" (3 pages), publication date unknown.
Request for *Ex Parte* Reexamination of US 6,755,107 dated Aug. 28, 2006, including Exhibits A-Q; granted tracking No. 90/008,197.
Response to Notice of Failure to Comply with *Ex Parte* Reexamination Request Filing Requirements (37 C.F.R. 1.510(c)), dated Oct. 5, 2006.
Papers from European Opposition Proceeding EP 01 309 338.0 based on EP 1 258 305, various dates.
Internet Printout of webpage titled "CPSC, Dewalt Industrial Tool Co. Announce Recall to Repair 12-inch Miter Saws" available at http://www.dewalt.com/us/articles/press-release.asp?Site=woodworking&ID=249, printed Jul. 26, 2007.
Alexander H. Slocum, Ph.D deposition transcript, dated Jan. 9, 2006.

* cited by examiner

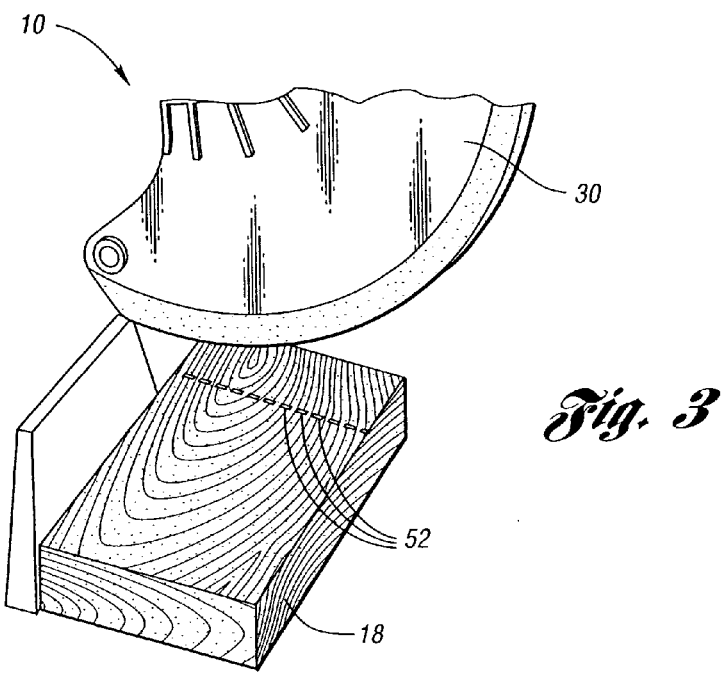
Fig. 3
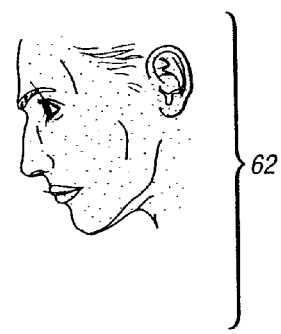
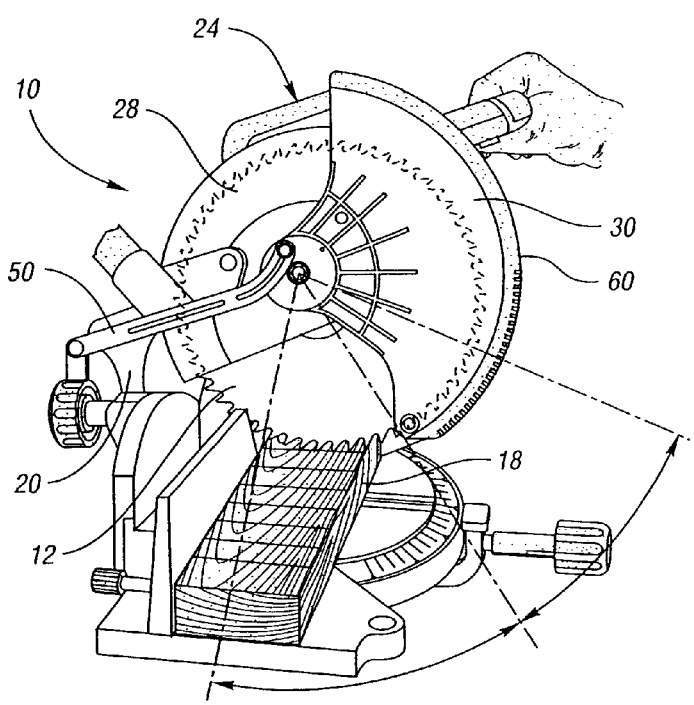
Fig. 4

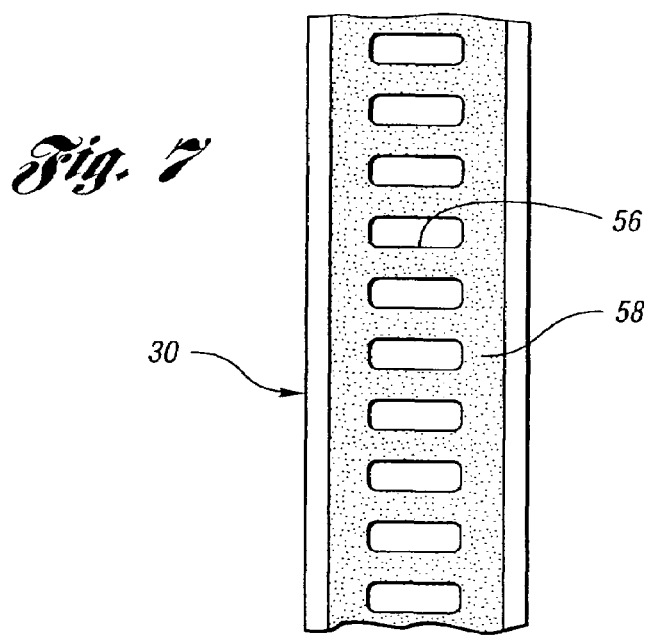
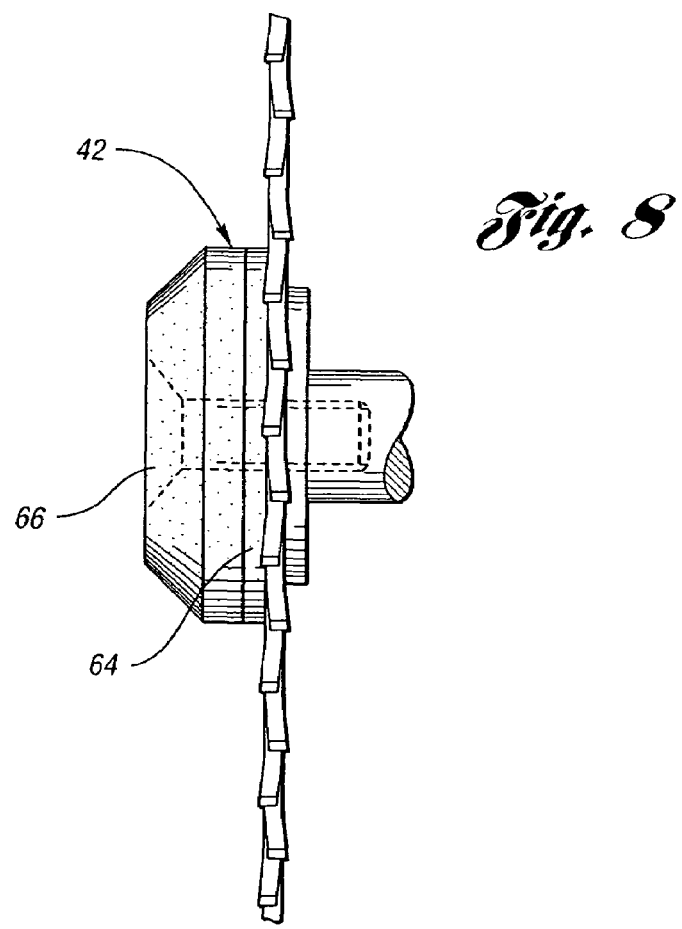

MITER SAW HAVING A LIGHT BEAM ALIGNMENT SYSTEM

This application is a continuation of U.S. Ser. No. 10/774,854, filed Feb. 9, 2004 now abandoned, which is a continuation of U.S. Ser. No. 09/860,898 filed May 18, 2001, now U.S. Pat. No. 6,755,107.

BACKGROUND OF THE INVENTION

1. Field of the Invention

The present invention relates to a miter saw having a laser, or other light source, alignment system that uses a beam of light for positioning a saw blade.

2. Background Art

Miter saws are used to cut wood and other materials at precise angles. For example, miter saws are used to cut crown moldings, cove moldings, and other trim pieces and structural members at precise angles. Miter saws generally have a circular blade that is rotated at a high rate of speed to cut workpieces. The blade is guarded by a retractable blade guard that covers the saw blade but is retracted as the blade is brought into contact with a workpiece. The workpiece is generally retained on a supporting table that is adjustable and, in conjunction with a fence, is used to position the workpiece for cutting by the saw blade.

Before cutting, workpieces are generally marked according to precise measurements to assure accuracy. A common problem with miter saws is that it takes a great deal of skill to consistently align the workpiece with the saw blade so that the saw blade cuts at the desired location and at the desired angle. With prior miter saws, it has not been possible to know if the saw alignment is proper until the saw begins to cut the material. If the workpiece is not set up at the correct location with the correct angular orientation, the workpiece may be ruined if it is not properly aligned when the saw blade contacts the workpiece.

A laser arbor for a rotary saw has been proposed in U.S. Pat. No. 5,862,727 to Kelly. The Kelly patent discloses the use of a semiconductor laser arbor for a rotary saw that is actuated by a centrifugal switch and directs a line of laser light on a workpiece. The Kelly patent does not disclose any shielding to prevent the laser from being directed into an operators eyes. Similarly, U.S. Pat. No. 6,035,757 to Caluori et al. discloses a similar semiconductor laser light beam alignment device for a rotary saw having a focusing lens that causes the light beam to be directed to the blade cut line. The Caluori patent likewise fails to disclose any shielding that prevents the laser from shining into an operator's eyes. Both patents also fail to disclose an effective approach to preclude inadvertent operation of the laser when the arbor is disassembled. Furthermore, both patents fail to disclose a system for precisely aligning the laser with the point at which the blade cuts into the workpiece.

An example of a blade guard for a power saw is disclosed in U.S. Pat. No. 5,199,343 to O'Banion. The O'Banion patent discloses a louvered blade guard that an operator can see through while cutting a workpiece. The blade guard has tapered louvers that provide a line-of-sight through a portion of the guard while impeding ejection of cutting debris through the louvers. The O'Banion patent does not disclose or suggest a laser arbor for a rotary saw or any reason to combine the louvered blade guard disclosed with a laser alignment device.

These problems are addressed by the saw having a laser alignment system that includes a laser arbor that rotates with the saw blade on the spindle.

SUMMARY OF THE INVENTION

According to one aspect of the present invention, a miter saw (or other rotary saw) is provided that includes a motor with a spindle to which a blade is secured and rotated by the motor to cut a workpiece that is disposed on a saw base. The motor is part of a saw head assembly that is pivotally supported on the base by an arm. A laser or other directed light source (hereinafter referred to as "laser" or "light source") is mounted to the spindle and rotated by the motor along with the blade. The light source emits a narrow beam of light adjacent to the blade that is used to check the alignment of the blade with the workpiece. A movable guard pivots to cover at least a portion of the blade that is not engaging the workpiece. The guard has an opaque portion that blocks the beam of light to prevent the beam of light from being directed toward an operator of the saw.

According to another aspect of the invention, the miter saw described above may include a movable guard that is provided with a transparent area through which a narrow beam of light may pass to project a pattern of light. The light transparent area may be one or more transparent areas in the opaque portion of the guard, or the guard may be formed of a transparent material having one or more portions thereof that are covered by a mask. The transparent area may be formed as a single gap, or a pattern of slits, or gaps, in the mask and, if desired, in the guard. A solid or interrupted (dotted) line is thus formed on the workpiece.

According to another aspect of the invention, the narrow beam of light may be permitted to project beyond one end of the movable guard to form a solid line on the workpiece just prior to and while the blade engages the workpiece so that the operator can see the line of cut for the saw.

According to another aspect of the invention, the miter saw may include a saw base having a fence against which the workpiece may be pressed to locate one side of the workpiece. The saw base has a pivoting portion that pivots relative to the fence and may be locked in a selected angular orientation for making a miter cut in a workpiece.

According to another aspect of the invention, the movable guard cooperates with a fixed guard portion to substantially enclose the blade and block the beam of light except for an area encompassing the workpiece.

According to yet another aspect of the invention, the miter saw includes an arbor having an arbor base with a first mounting surface. A light source has a housing including a second mounting surface. The first and second mounting surfaces are secured together in a range of angular orientations for precisely aligning the light source. The mounting surfaces may be arcuate surfaces to facilitate alignment. The first and second surfaces may be secured together by a set screw or by a bonding agent. When the light source is rotated by the motor in conjunction with the blade, it emits a narrow beam of light adjacent the blade for providing a visual indication of the alignment of the blade with the workpiece.

The invention may also be characterized as a miter saw including a light source that is battery powered. The light source is mounted to an arbor having and arbor base and a cover wherein the cover is removable from the base and when removed from the base carries with it at least battery. By removing at least one battery as the cover is removed, the light source is prevented from operating when the cover is removed from the arbor base. The arbor base may include spring contacts for establishing electrical contact with the batteries that are carried by the cover when the cover is removed from the arbor base.

These and other aspects of the invention and advantages of the invention over the prior art will be better understood in view of the attached drawings and following detailed description provided below.

BRIEF DESCRIPTION OF THE DRAWINGS

FIG. 3 is a perspective view of a miter saw just prior to cutting a workpiece;

FIG. 4 is a fragmentary side perspective view of a miter saw having a plotted laser light line projecting on a workpiece;

FIG. 7 is a fragmentary view taken along line 6-6 in FIG. 5;

FIG. 8 is a fragmentary front elevation view of a saw blade and laser arbor;

DETAILED DESCRIPTION OF THE PREFERRED EMBODIMENT(S)

Figure 1:
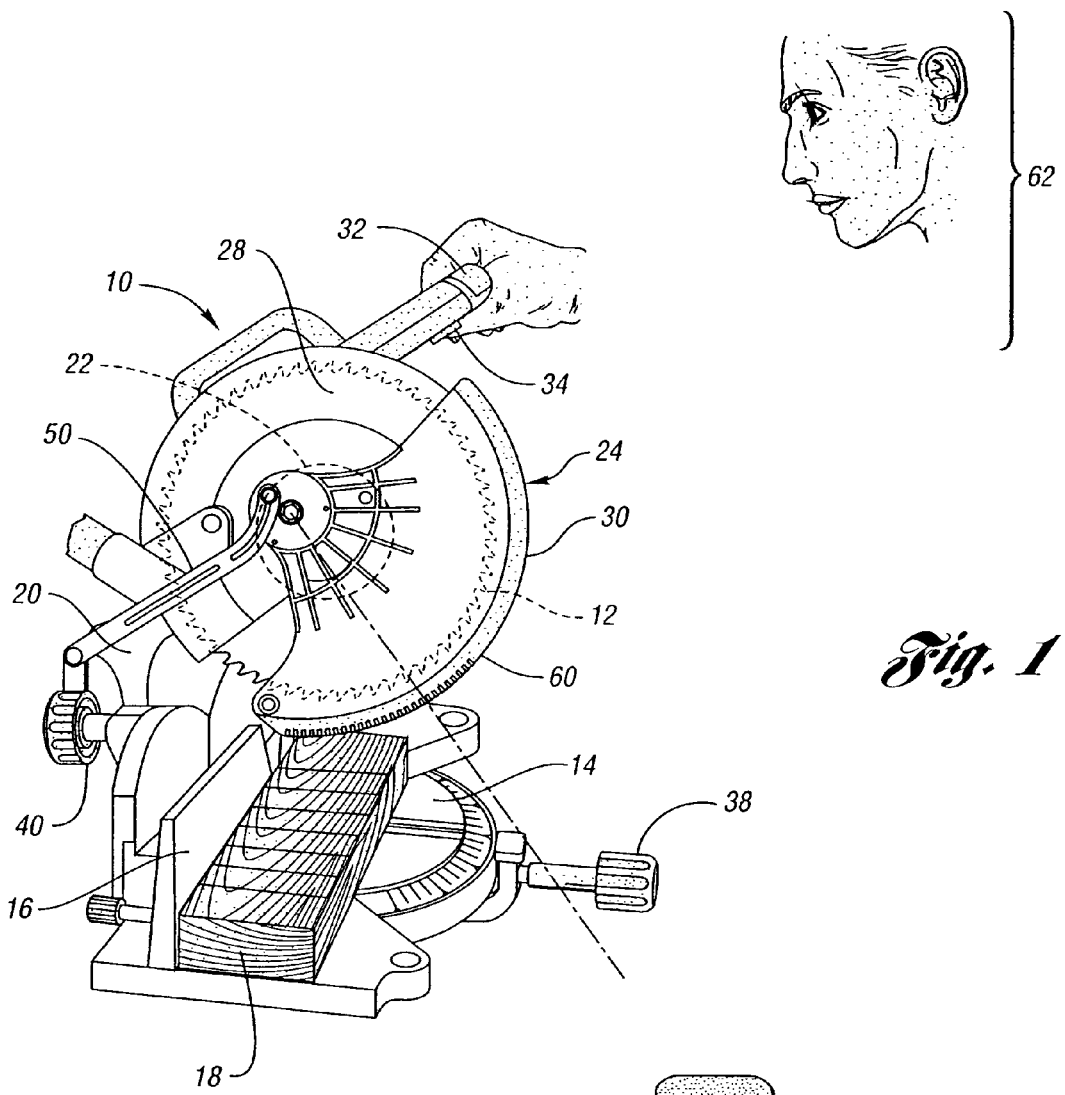
FIG. 1 is a side elevation view of a miter saw.

Referring now to FIG. 1, a miter saw 10 having a circular saw blade 12 is shown. The miter saw 10 also includes a base 14 and fence 16 against which a workpiece 18 is located when the workpiece 18 is cut by the miter saw 10. An arm 20 connects the motor assembly 22 that forms part of the saw head assembly, generally indicated by reference numeral 24. The saw head assembly 24 includes a circular saw blade 12 and also includes a fixed guard 28 and movable shield 30 as well as a handle 32 that includes the power switch 34.

The saw 10 shown in the illustrated embodiment is a compound miter saw having a miter angle adjustment mechanism 38 and a tilt adjustment mechanism 40. While the illustrated embodiment is of a compound miter saw, the invention is equally applicable to a simple miter saw, a sliding compound miter saw, or a chop saw. The saw head assembly 24 is pivotally connected to the arm 20 and includes a spring (not shown) for biasing the saw head assembly 24 out of engagement with the workpiece 18.

When an operator is ready to make a cut with the miter saw 10, the operator grips the handle 32 and pulls it down toward the workpiece 18 as he depresses the power switch 34 causing the circular saw blade 12 to rotate. The miter angle adjustment mechanism 38 permits the base 14 to rotate relative to the arm 20 to change the transverse angle of cut. The tilt adjustment mechanism 40 allows the saw head assembly 24 to be pivoted and the transverse inclination of the blade to be adjusted.

Figure 2:
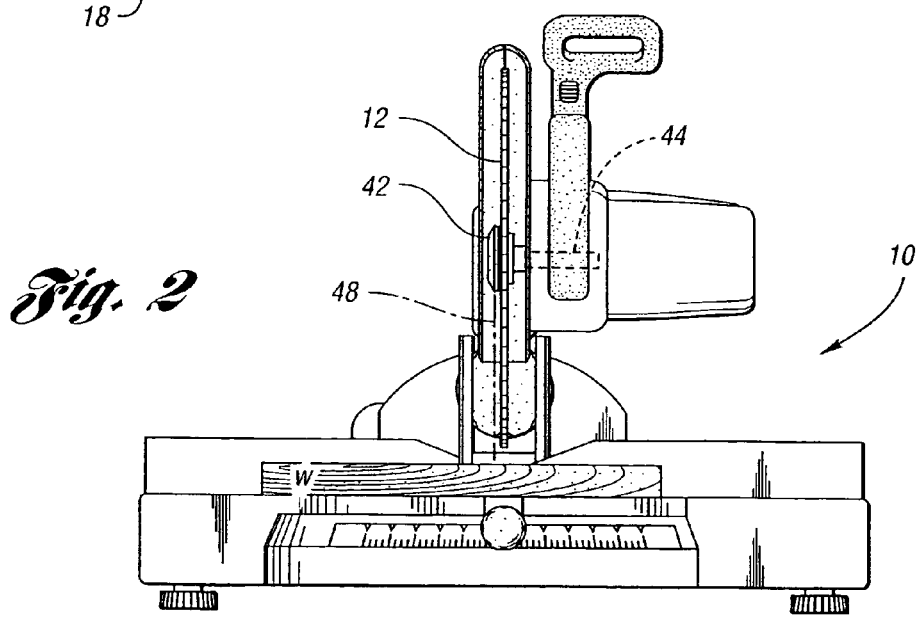
FIG. 2 is a front elevation view partially in cross section of a miter saw having a laser arbor.
Figure 5:
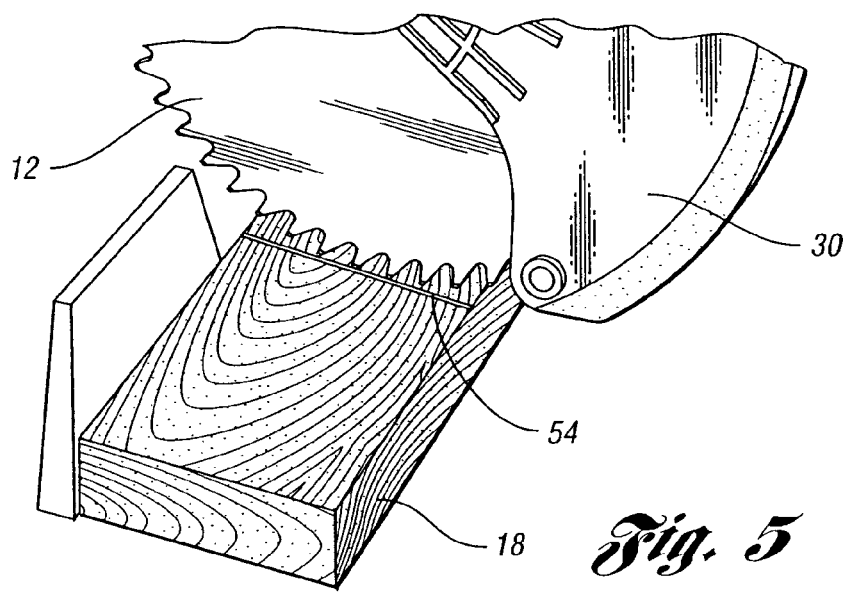
FIG. 5 is a fragmentary perspective view showing a solid laser line projected on a workpiece just prior to cutting.

Referring now to FIG. 2, a miter saw 10 having a laser arbor 42 is illustrated. The laser arbor 42 is mounted adjacent the saw blade 12 on the same spindle 44 as the saw blade. The laser arbor 42 directs a laser beam 48 in a plane as the laser arbor 42 is rotated by the spindle 44. The light beam is tilted toward the blade edge. While the light source is described as a laser, another battery operated light source such as a light emitting diode (LED), focused electric light bulb based system or small flashlight could be used with the miter saw 10. The structure of the laser arbor 42 will be more specifically described below with reference to FIGS. 8 and 9.

As noted above, a light beam 48 is formed by a dot, directed in a plane tilted inwardly toward the blade edge. Alternatively, the light beam could be projected parallel to the plane of the circular saw blade 12 to indicate the starting edge of the blade cut.

Referring now to FIG. 3, the miter saw 10 is shown just prior to the saw blade 12 cutting the workpiece 18. The saw head assembly 24 has been pivoted on the arm 20. The movable shield 30 has been rotated by the link 50 to a position partially overlying the fixed guard 28. The movable shield 30 is still covering the portions of the saw blade 12 that are not within the fixed guard 28 and not adjacent the workpiece 18.

Figure 6:
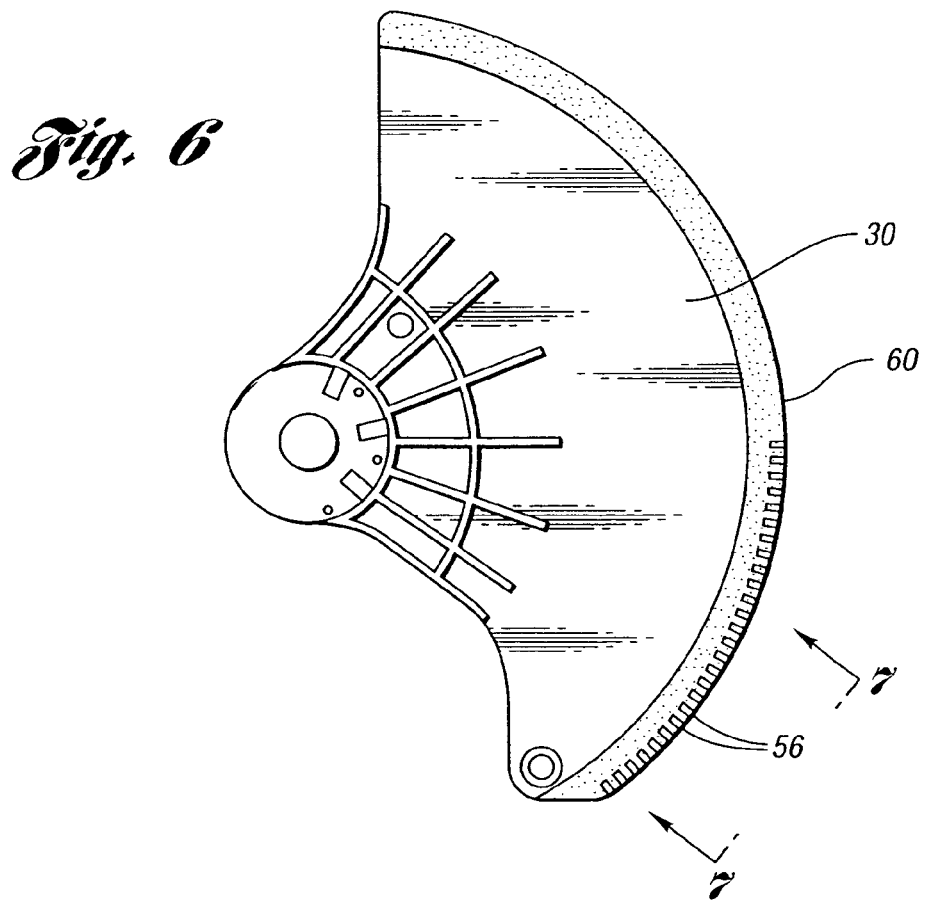
FIG. 6 is a side elevation view of a movable guard.

In one embodiment described below in connection with FIGS. 6 and 7, a dotted line 52 is projected on the workpiece 18 as shown in FIG. 4 when the power switch 34 is actuated and the movable shield 30 is in the position shown in FIG. 1. When the saw head assembly 24 has been pivoted to the position shown in FIG. 3, the laser arbor forms a solid line 54 on the workpiece 18 as shown in FIGS. 6 and 7. However, it will be appreciated that line 52 can be formed as a solid line instead of a dotted/dashed line.

The dotted line shown in FIG. 4 permits the alignment of the workpiece with the base 14 to be immediately assessed by actuating the power switch 34 even prior to lowering the saw head assembly 24. When the shield 30 moves to the position shown in FIG. 3, the solid line 54 formed by the laser beam 48 indicates the location of cut just prior to and during the cutting operation.

Referring now to FIGS. 6 and 7, the movable shield 30 is shown in greater detail. The shield has a series of slits 56 or openings. The movable shield 30 may be formed of an opaque material or a transparent material. If the movable shield 30 is formed of a transparent material, an opaque mask 58 is provided on the peripheral edge 60 of the shield 30 that prevents the laser beam 48 from being projected upwardly toward the eyes of an operator. As shown in FIGS. 1 and 3, a range of normal operator eye position is indicated by reference numeral 62. The range of normal operator eye position 62 corresponds to the expected position of an operator's eyes taking into account the expected eye level of any operator in a wide range of heights and also regardless of whether the operator is sitting or standing. The laser beam 48 is not permitted to be projected, in this normal eye position 62, regardless of the position of the saw head assembly 24.

When the shield 30 is in the position shown in FIG. 1, the laser beam 48 projects through the slits 56 to form the dotted line 52 on the workpiece 18. When the saw head assembly 24 is rotated and the movable shield 30 is pivoted by the link 50 to the position shown in FIG. 3, the portion of the shield 30 including the slits 56 are shifted from between the saw blade 12 and the workpiece 18. Instead of a series of slits 56, a single transparent area can be formed in the shield so that a solid line is formed on the workpiece when the shield is in the position of FIG. 1.

Figure 9:
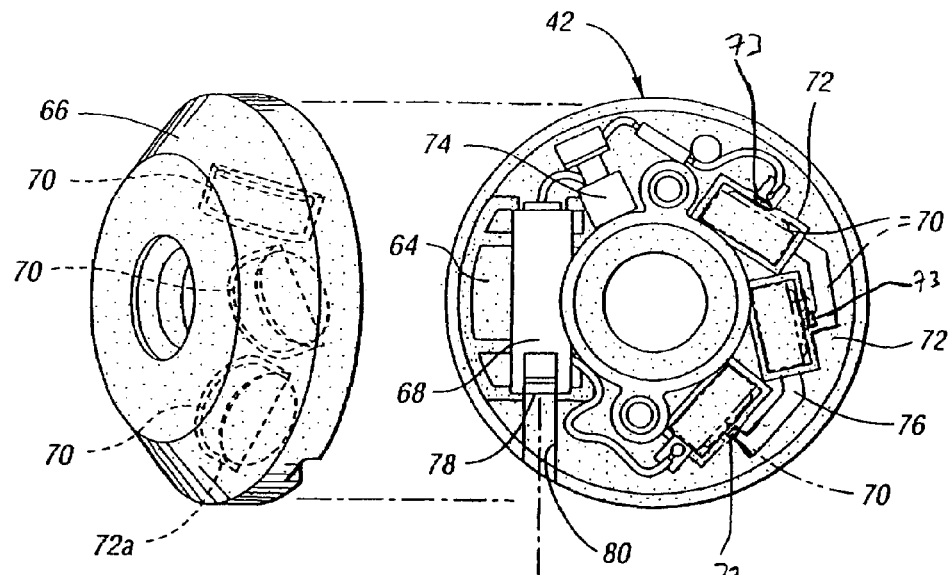
FIG. 9 is a plan view of a partially disassembled laser arbor.

Referring now to FIGS. 8 and 9, the laser arbor 42 will be described in greater detail. The laser arbor 42 includes a washer 64 upon which components are mounted and a cover 66 that covers and protects the laser arbor components mounted on the washer 64, or arbor base. Laser arbor 42 includes a laser module 68 that is powered by batteries 70. The batteries 70 are mounted in battery receptacles 72a in the cover 66. The batteries are received in cooperating battery receptacles 72b (best seen in FIG. 10) formed in the washer 64 when the cover is properly placed on the base. Spring contacts 73 are provided on the washer 64 to establish electrical contact with the batteries when the cover 66 is properly secured to the washer 64. The laser module 68 is operated by a reed switch 74 or equivalent centrifugally actuated switch. The reed switch 74 only supplies power to the laser module 68 when the saw blade 12 is rotated above the predetermined rotational speed. A printed circuit board 76 is provided to control the operation of the laser arbor 42 in conjunction with the reed switch 74. The laser module includes a lens 78 that directs the laser beam 48 through an opening 80 in the laser arbor 42.

Figure 10:
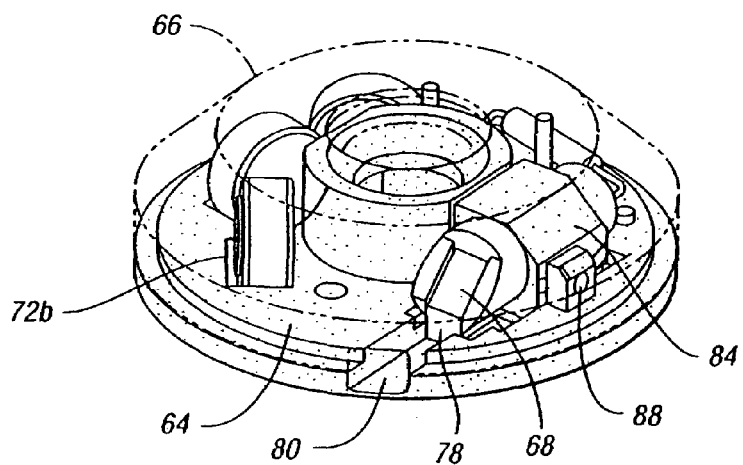
FIG. 10 is a perspective view of a laser arbor having a laser module mounted on an arcuate mounting surface.
Figure 11:
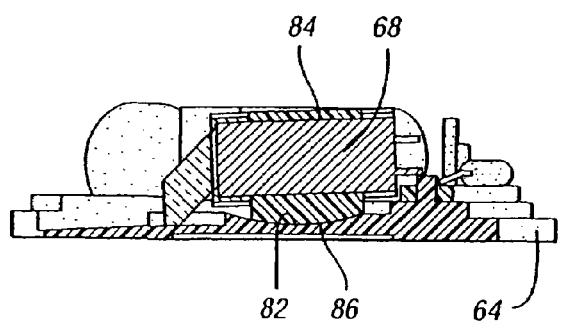
FIG. 11 is a cross-sectional view of a laser arbor having a laser module mounted on an arcuate mounting surface.

Referring now to FIGS. 10 and 11, the laser module 68 may be mounted in the laser arbor 42 on the washer 64, or arbor base, having an arcuate mounting surface 82. The laser module 68 has a housing 84 that includes a complimentary arcuate mounting surface 86. The laser module 68 is secured to the laser arbor with the arcuate mounting surfaces 82, 86 in contact with each other. The laser module 68 is held on arcuate mounting surfaces 82, 86 with the lens 78 and opening 80 disposed at a slight angle of inclination to be directed toward the teeth of the circular saw blade 12. A set screw 88, glue or other bonding agent is used to lock the laser module 68 on the mounting surface 82. To compensate for the laser module 68 being slightly axially offset from the saw blade 12, the laser module is preferably held at a slight angle relative to the saw blade so that the laser beam 48 is formed on the workpiece in alignment with the edge of the blades when the arbor is rotated. In this way, the laser beam 48 can be projected as close as possible to the point at which the saw blade 12 will cut the workpiece 18 so that markings corresponding to the desired location of cut on the workpiece 18 can be closely aligned with the laser beam 48 both when projected preliminarily as a solid or dotted line 52 and when projected as a solid line 54.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A miter saw comprising:
   a) a motor;
   b) a saw base;
   c) an arm connecting the motor to the saw base and being movable between an upper position and a lower position;
   d) a spindle that is rotatably driven through operation of the motor
   e) a blade secured to the spindle;
   f) a laser light source mounted to the spindle and arranged to be rotated in conjunction with the blade, the laser light source emitting a narrow beam of light adjacent the blade for providing a visual indication of the alignment of the blade with the workpiece; and
   g) a moveable guard that pivots to cover at least a portion of the blade that is not engaging the workpiece, the movable guard including:
      i) a mask portion that is configured to prevent the narrow beam of light from being projected toward a normal eye position of an operator, and
      ii) a slotted portion that is configured to allow the narrow beam of light to be projected on a portion of the workpiece when the arm is in the upper position.

2. The miter saw of claim 1 wherein the slotted portion includes at least one aperture.

3. The miter saw of claim 1 wherein the slotted portion comprises a plurality of apertures in an outer edge of the movable guard.

4. The miter saw of claim 3 wherein the slotted portion is positioned between the blade and the saw base when the arm is in the upper position.

5. The miter saw of claim 1, wherein a portion of the mask portion extends into the slotted portion.

6. The miter saw of claim 1, wherein the miter saw is a compound miter saw.

7. The miter saw of claim 6, wherein the compound miter saw is a sliding compound miter saw.

8. A saw comprising:
   a) a motor;
   b) a saw base;
   c) an arm connecting the motor to the saw base wherein the arm is movable between an upper position and a lower position;
   d) a spindle that is rotatably driven through the operation of the motor;
   e) a blade secured to the spindle to cut a workpiece disposed on the saw base when the arm is moved toward the lower position;
   f) a laser arbor secured to the spindle;
   g) a laser source attached to the laser arbor and arranged to be rotated simultaneously with the blade, the laser source emitting a narrow beam of light adjacent the blade for providing a visual indication of the alignment of the blade with the workpiece; and
   h) a moveable guard that pivots to enclose at least a portion of the blade that is not engaging the workpiece, the movable guard including:
      i) an outer edge having a mask portion that is configured to prevent the narrow beam of light from being projected toward a normal eye position of an operator, and
      ii) a slotted portion that is configured to allow the narrow beam of light to pass through the movable guard to create a line of light on the workpiece when the outer edge of the moveable guard is disposed between the laser and the workpiece.

9. The saw of claim 8 wherein the slotted portion includes at least one aperture.

10. The saw of claim 8 wherein the slotted portion comprises a plurality of apertures formed in the outer edge of the movable guard.

11. The saw of claim 8, wherein a portion of the mask portion extends into the slotted portion.

12. The saw of claim 8, wherein the saw is a compound miter saw.

13. The saw of claim 12, wherein the compound miter saw is a sliding compound miter saw.

14. A miter saw comprising:
   a) a motor and a spindle that is rotatably driven through operation of the motor;
   b) a saw base;
   c) an arm connecting the motor to the saw base wherein the arm is movable between an upper position and a lower position;
   d) a blade secured to the spindle which is rotatably driven through operation of the motor to cut a workpiece disposed on the saw base;
   e) a light arbor secured to the spindle;
   f) a laser light source emitting a narrow beam of light adjacent the blade mounted to the light arbor and arranged to be rotated simultaneously with the blade, the light source comprising at least one battery and emitting a narrow beam of light adjacent the blade for providing a visual indication of the alignment of the blade with the workpiece, the light arbor having an arbor base to which the light source is secured and a cover to which the at least one battery is secured, wherein removal of the cover from the arbor base prevents inadvertent operation of the light source when the cover is so removed; and g) a movable guard that pivots to cover at least a portion of the blade that is not engaging the workpiece, the movable guard including:

i) an outer edge having a mask portion that is configured to block the beam of light to prevent the beam of light from being directly projected toward a normal eye position of an operator; and ii) a slotted portion that is configured to allow the narrow beam of light to be projected on the workpiece when the outer edge of the movable guard is disposed between the laser and the workpiece.

15. The miter saw of claim 14 wherein the light source is powered by a plurality of batteries and wherein all of the batteries are removed with the cover when the cover is removed.

16. The miter saw of claim 14 wherein the arbor base includes spring contacts arranged to establish electrical contact with the at least one battery only when the cover is properly secured to the arbor base.

17. The miter saw of claim 14, wherein a portion of the mask portion extends into the slotted portion.

18. The miter saw of claim 14, wherein the miter saw is a compound miter saw.

19. The miter saw of claim 18, wherein the compound miter saw is a sliding compound miter saw.

20. A miter saw comprising:

a) a motor and a spindle that is rotatably connected to the motor, wherein the spindle is rotatably connected with a saw blade;

b) a base for supporting a workpiece;

c) an arm connecting the motor and the base having an upper position where the saw blade does not contact the workpiece and a lower position where the saw blade contacts the workpiece;

d) a laser light source mounted to the spindle to rotate with the saw blade and emitting a beam of light;

e) a fixed blade guard that encloses a portion of the saw blade and is stationary with respect to the arm; and, f) a movable guard that encloses a portion of the saw blade when the arm is in the upper position and exposes a portion of the saw blade when the arm is moved toward the lower position, the movable guard formed with:

i) an outer edge wherein a section of the outer edge is configured to prevent the beam of light from being projected toward a normal eye position of an operator, and ii) a slotted portion formed with a plurality of apertures that are configured to allow the beam of light to shine on the workpiece.

21. The miter saw of claim 20, wherein the miter saw is a compound miter saw.

22. The miter saw of claim 20, wherein the outer edge further comprises a mask portion that extends into the slotted portion.

* * * * *